US012776687B2

(12) United States Patent
Sato et al.

(10) Patent No.: US 12,776,687 B2
(45) Date of Patent: Oct. 27, 2026

(54) ELECTRIC ACTUATOR AND METHOD FOR MANUFACTURING THE SAME

(71) Applicant: HI-LEX ACT Corporation, Yokohama (JP)

(72) Inventors: Hiroshi Sato, Yokohama (JP); Shinichiro Kita, Yokohama (JP)

(73) Assignee: HI-LEX ACT CORPORATION, Yokohama (JP)

( * ) Notice: Subject to any disclaimer, the term of this patent is extended or adjusted under 35 U.S.C. 154(b) by 227 days.

(21) Appl. No.: 18/429,578

(22) Filed: Feb. 1, 2024

(65) Prior Publication Data

US 2024/0305167 A1 Sep. 12, 2024

(30) Foreign Application Priority Data

Mar. 8, 2023 (JP) ................................ 2023-035561

(51) Int. Cl.

| | |
|---|---|
| ***H02K 11/00*** | (2016.01) |
| ***H02K 11/215*** | (2016.01) |
| ***H02K 11/30*** | (2016.01) |
| ***H02K 15/00*** | (2006.01) |

(52) U.S. Cl.

CPC ....... *H02K 11/0094* (2013.01); *H02K 11/215* (2016.01); *H02K 11/30* (2016.01); *H02K 15/00* (2013.01); *H02K 2211/03* (2013.01)

(58) Field of Classification Search

CPC .. H02K 11/0094; H02K 11/215; H02K 11/30; H02K 11/33; H02K 15/00; H02K 2211/03; H02K 29/08

See application file for complete search history.

(56) References Cited

U.S. PATENT DOCUMENTS

| | | | | |
|---|---|---|---|---|
| 9,787,159 | B2 * | 10/2017 | Beyerl | H02K 7/145 |
| 2003/0146672 | A1 * | 8/2003 | Fukushima | H02K 3/26 310/268 |
| 2013/0313925 | A1 * | 11/2013 | Mergener | H02K 29/08 310/50 |
| 2018/0326568 | A1 * | 11/2018 | Fauteux | H02K 11/33 |

FOREIGN PATENT DOCUMENTS

| | | | |
|---|---|---|---|
| JP | 2008-253010 | A | 10/2008 |
| JP | 2020-162367 | A | 10/2020 |
| JP | 2021-055500 | A | 4/2021 |
| JP | 6955195 | B | 1/2024 |

* cited by examiner

*Primary Examiner* — Naishadh N Desai

(74) *Attorney, Agent, or Firm* — Foley & Lardner LLP

(57) ABSTRACT

The electric actuator comprises an electric brushless motor having a rotor and a stator, and the control board has a plurality of electric components and controls operation of the brushless motor. The control board comprises a main board and a small board that has a smaller planar shape than the main board and that is connected to the main board via a connecting member. The small board has one or more electric components, faces the rotor, and is arranged at a position closer to the rotor than is the main board in the rotation axis direction of the rotor.

13 Claims, 6 Drawing Sheets

ELECTRIC ACTUATOR AND METHOD FOR MANUFACTURING THE SAME

TECHNICAL FIELD

The present invention relates to an electric actuator and a method for manufacturing the same.

BACKGROUND ART

An electric actuator that includes a motor is used to drive various movement mechanisms such as an opening/closing mechanism (sliding device) for a sliding door of an automobile as described in Patent Document 1. A typical electric actuator includes components such as a brushless motor having a stator and a rotor, and a control board that controls the operation of the brushless motor. Examples of such electric actuators are described in Patent Documents 2 and 3. In the electric actuator described in Patent Document 2, short electrical components of the control board are arranged in an inner region which faces the electric motor, and tall electrical components of the control board are arranged in an outer region. In the electric actuator described in Patent Document 3, a portion of a resin part that holds a rotor magnet extends in a direction approaching a magnetic sensor, and the sensor magnet is attached to this extending part.

PRIOR ART DOCUMENTS

Patent Documents

Patent Document 1: JP2021-55500A
Patent Document 2: JP6955195B
Patent Document 3: JP2020-162367A

SUMMARY OF THE INVENTION

Problem to be Solved by the Invention

It is preferable that some of the electrical components mounted on the control board, such as a magnetic sensor (Hall IC) for detecting the position and rotational state of the rotor, be placed as close to the rotor as possible. On the other hand, the stator coil and the control board cannot be placed very close to each other.

In the structure of Patent Document 2, the rotor is made longer than the stator in the rotation axis direction of the rotor, so that the rotor is brought close to the control board. Therefore, some of the electrical components mounted on the control board can be brought close to the rotor. However, the length of the rotor in the rotation axis direction, which is extended to be brought close to the control board, does not equal the length of the stator in the rotation axis direction. Therefore, a deviation occurs between the center position of the rotor in the direction of the rotation axis and the center position of the stator in the direction of the rotation axis. As a result, the rotational inertia of the rotor increases and vibration (backlash) in the axial direction occurs when the rotor rotates, and these factors may reduce the durability of the electric motor. Furthermore, increasing the length of the rotor in the rotation axis direction causes the electric actuator to become larger and more expensive.

In the structure of Patent Document 3, it is possible to place the sensor magnet and the magnetic sensor close to each other. However, a portion of the resin part is extended in the direction of increasing proximity of the resin part to the magnetic sensor, and the sensor magnet is attached to the extended part, and these factors result in a more complicated structure, cumbersome manufacturing, and an increase in the size and expense of the electric actuator.

Therefore, an object of the present invention is to provide an electric actuator and a method for manufacturing the same that allow a rotor of the electric actuator to rotate stably, that allow some electric components of a control board to be placed close to the rotor, and that suppress increase in the size and cost of the electric actuator.

Means to Solve the Problem

An electric actuator of the present invention comprises an electric brushless motor having a rotor and a stator, and a control board that has a plurality of electric components and that controls operation of said brushless motor, wherein said control board comprises a main board and a small board which has a smaller planar shape than said main board and which is connected to said main board via a connecting member, and wherein said small board has one or more of said electric components, faces said rotor, and is arranged at a position closer to said rotor than said main board in the rotation axis direction of said rotor.

Said electric component(s) included on said small board may be a magnetic sensor that detects a magnet of said rotor.

Said small board may overlap a part of said main board when viewed in said rotation axis direction.

Said main board may have a convex portion that protrudes toward said rotor when viewed in the rotation axis direction, and said small board may overlap with said convex portion when viewed in the rotation axis direction.

Said small board may have the planar shape included within the planar shape of said convex portion.

Said small board may be fixed to said main board by a screw.

Said main board may have an electronic control unit at a position that does not overlap with said small board when viewed in the rotation axis direction.

A method for manufacturing an electric actuator of the present invention comprises steps of installing an electric brushless motor having a rotor and a stator; cutting a board material which has a plurality of electrical components to separate said board material into a main board and a small board which has a smaller planar shape than said main board and which has one or more of said electrical components; arranging said small board at a position which faces said rotor and is closer to said rotor than said main board in the rotation axis direction of said rotor; and connecting said small board to said main board by a connecting member.

Said electric components included on said small board may include a magnetic sensor that detects a magnet of said rotor, and said small board may be arranged such that said magnetic sensor faces said magnet.

Said small board may be arranged to partially overlap said main board when viewed in the rotation axis direction.

Said main board may have a convex portion that protrudes toward said rotor when viewed in the rotation axis direction, a protruding portion that will become said small board may be integrally formed of said board material at a position adjacent to a portion that will become said convex portion of said main board, and said protruding portion may be cut from said board material to separate said small board and said main board.

Said small board may have the planar shape included within the planar shape of said convex portion, and said small board may be arranged to overlap said convex part when viewed in the rotation axis direction.

Said small board may be fixed to said main board by a screw, and the distance between said small board and said rotor may be adjusted by said screw.

Said main board may have an electronic control unit, and said small board may be arranged so as not to overlap said electronic control unit when viewed in the rotation axis direction.

Effect of the Invention

According to the present invention, it is possible to obtain an electric actuator in which the rotor can rotate stably, some electrical components of the control board can be placed close to the rotor, and increase in size and cost can be suppressed.

EMBODIMENTS OF THE INVENTION

Embodiments of the present invention will next be described with reference to the drawings.

Figure 1:
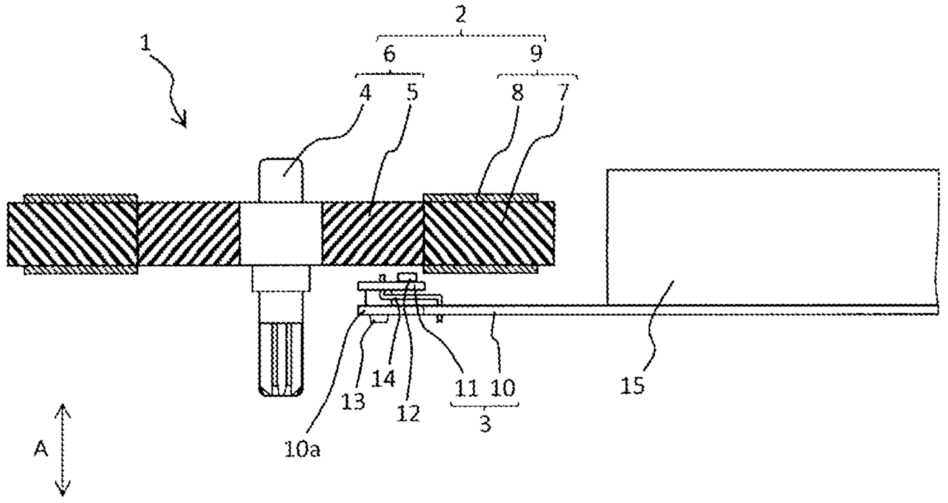
FIG. 1 is a sectional view schematically showing the basic structure of an electric actuator of the present invention.
Figure 2:
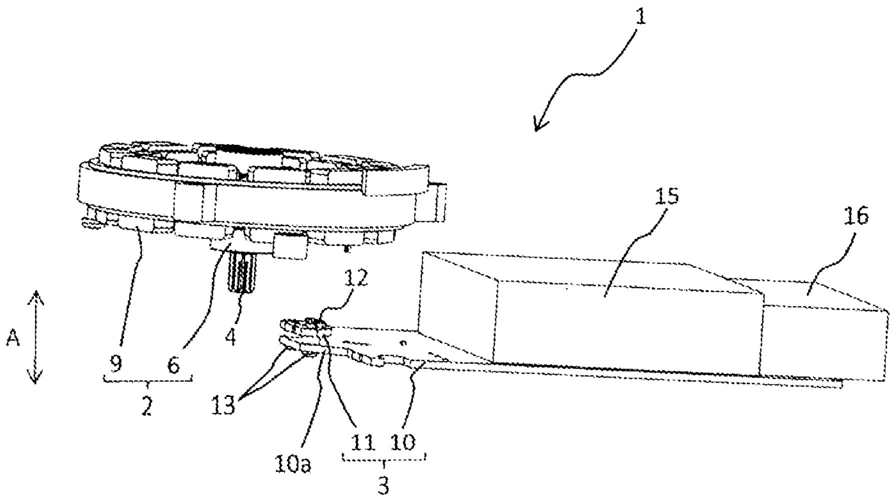
FIG. 2 is a perspective view of the basic structure of the electric actuator shown in FIG. 1.

FIG. 1 is a sectional view schematically showing the basic structure of electric actuator 1 of the present invention, and FIG. 2 is a perspective view thereof. This electric actuator 1 includes motor 2 and control board 3 that has a plurality of electrical components and that controls the operation of motor 2. Motor 2 is a flat brushless electric motor that includes rotor 6 and stator 9. Rotor 6 is rotatably supported and includes rotating shaft 4 and magnet 5, and stator 9 is disposed around rotor 6 and includes core 7 and coil 8. Rotor 6 and stator 9 extend in a direction perpendicular to the direction in which rotation shaft 4 of rotor 6 extends (rotation shaft direction A, which is the vertical direction in FIG. 1). In FIG. 1, a support mechanism for rotor 6 and fixing mechanism 9*a* for stator 9 (see FIG. 6) are omitted, and rotor 6 and stator 9 are shown in a simplified manner.

Control board 3 includes main board 10 and small board 11 having a smaller planar shape than main board 10. Main board 10 has convex portion 10*a* that protrudes toward rotor 6 when viewed in rotation axis direction A. Small board 11 includes a magnetic sensor (such as a Hall IC) 12 that detects some electrical components, such as magnet 5 of rotor 6. Small board 11 has the planar shape that is included within the planar shape of convex portion 10*a* of main board 10. Small board 11 is arranged at a position that overlaps convex portion 10*a* when viewed in the direction of rotation axis A. Small board 11 is fixed to the main board 10 by screws 13 and is electrically connected to main board 10 via connecting member 14. Small board 11 faces rotor 6 and is disposed at a position closer to rotor 6 than main board 10 in a direction perpendicular to rotation axis direction A of rotor 6, that is, when viewed along rotation axis direction A. Magnetic sensor 12 faces magnet 5. Main board 10 has electronic control unit (ECU) 15 and connector 16. ECU 15 and connector 16 are located at positions that do not overlap small board 11 when viewed in rotation axis direction A. In this structure, control board 3 that controls the operation of motor 2 is composed of two members (main board 10 and small board 11). Only small board 11 having magnetic sensor 12 is close to rotor 6 in rotation axis direction A of rotor 6.

The technical idea of electric actuator 1 of this embodiment will next be explained. Conventionally, control board 3 that controls the operation of motor 2 is composed of a single plate-shaped member. It is difficult to simultaneously achieve the following two features: one feature being the placement of some of the electrical components mounted on control board 3 such as a magnetic sensor (Hall IC, etc.) 12 close to magnet 5 of rotor 6, and the other feature being the arrangement of control board 3 remote from coil 8 and fixing mechanism 9*a* of stator 9. In the structures described in Patent Documents 2 and 3, when the length of rotor 6 in rotation axis direction A is increased or when an additional member such as a sensor magnet is provided on rotor 6, magnet 5 of rotor 6 can be brought close to control board 3. However, this configuration may lead to unstable rotation of rotor 6, an increase in the size and cost of motor 2, and a complicated manufacturing process. Therefore, the present invention adopts a novel structure in which rotor 6 is not brought close to control board 3 but a part of control board 3 is brought close to magnet 5 of rotor 6. Specifically, in the present invention, control board 3 is separated into two members, one of which is placed at a position that faces stator 9 but that is remote from coil 8, and the other of which is placed at a position that faces rotor 6 but that is close to magnet 5. In this specification, the portion that faces stator 9 is referred to as main board 10, and the portion that faces rotor 6 has a smaller planar shape than main board 10 and is referred to as small board 11.

In the present invention, main board 10 and small board 11 are arranged at different positions from each other in rotation axis direction A. Therefore, as described above, main board 10 that faces stator 9 is located away from coil 8, and small board 11 that faces rotor 6 is located close to magnet 5. As a result, it is possible to suppress the influence on control board 3 caused by coil 8 of stator 9 as well as to use magnetic sensor 12 to detect magnet 5 of rotor 6 with high precision. Furthermore, since rotor 6 does not extend in rotation axis direction A and the lengths of rotor 6 and stator 9 in rotation axis direction A are substantially equal, it is possible to match their center positions in rotation axis direction A. As a result, rotor 6 can be rotated stably, and increase in size and cost of the motor 2 can be suppressed. Furthermore, arranging ECU 15 at a position that does not overlap with either small board 11 or motor 2 when viewed in rotation axis direction A suppresses increase of the thickness in rotation axis direction A, improves space efficiency, and decreases the size of electric actuator 1.

Figure 3:
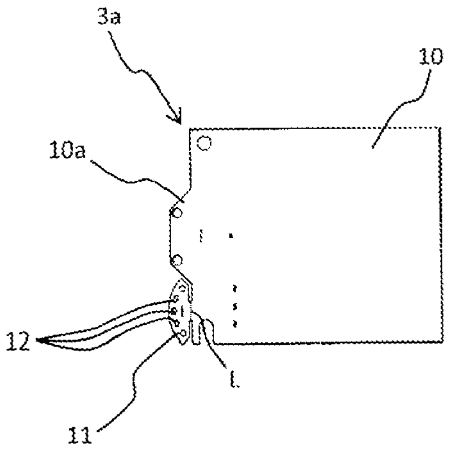
FIG. 3 is a plan view of the board material of the control board of the electric actuator shown in FIG. 1.
Figure 4:
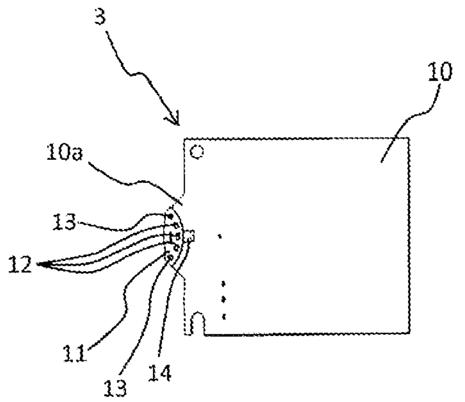
FIG. 4 is a plan view of a control board showing a part of the method for manufacturing the electric actuator shown in FIG. 1.
Figure 5:
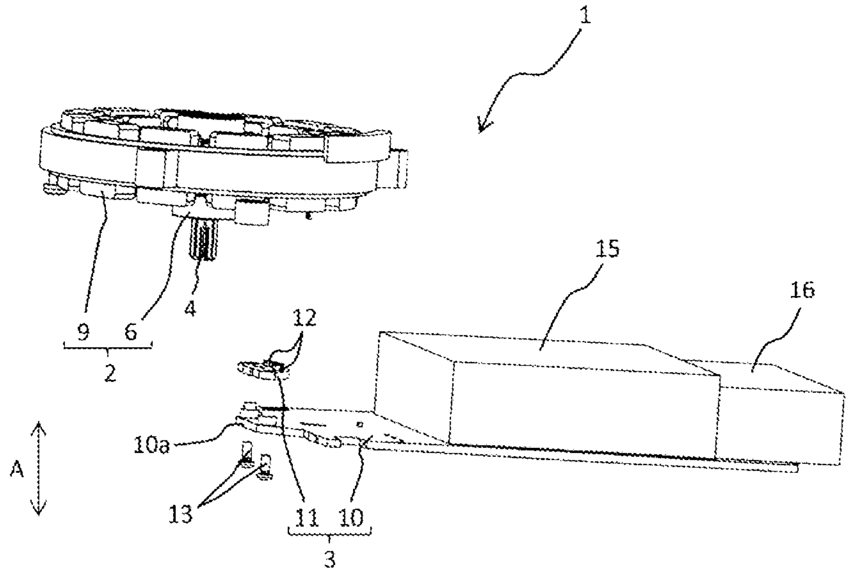
FIG. 5 is an exploded perspective view showing a part of the method for manufacturing the electric actuator shown in FIG. 1.

Next, the main parts of a method for manufacturing electric actuator 1 shown in FIGS. 1 and 2 will be explained. In this embodiment, board material 3*a* shown in FIG. 3 is formed. Board material 3*a* is a material in which main board 10 and small board 11 are integrated. That is, board material 3*a* has a form in which small board 11 and main board 10 including convex portion 10*a* are connected along imaginary line L and are integrally formed by an ordinary wiring board manufacturing method. Although not shown, electrical wiring is formed on board material 3*a*, and various electrical components (including magnetic sensor 12 on small board 11) are mounted on board material 3*a*. The protruding portion that will become small board 11 is provided in an empty space on one side of convex portion 10*a*. The board material 3*a* formed in this way is cut along imaginary line L to separate main board 10 and small board 11. Then, as shown in FIGS. 4 and 5, small board 11 is arranged parallel to main board 10 so as to overlie convex portion 10*a* when viewed in a direction (rotation axis direction A) perpendicular to the plate surface, and small board 11 is fixed to convex portion 10*a* with screws 13. Furthermore, small board 11 is electrically connected to main board 10 by connecting member 14, whereby, magnetic sensor 12 on small board 11 is electrically connected to the electrical wiring (not shown) on main board 10 via connecting member 14.

On the other hand, although not described in detail, rotor 6 is rotatably held and stator 9 is fixed to surround rotor 6 using a method similar to a conventional method. Convex portion 10*a* of main board 10 faces rotor 6, the remainder of main board 10 faces stator 9, and magnetic sensor 12 of small board 11 faces magnet 5 of rotor 6. Control board 3 is fixed so that small board 11 is closer to rotor 6 than main board 10 in rotation axis direction A of rotor 6. In this way, electric actuator 1 shown in FIGS. 1 and 2 is formed.

According to the manufacturing method of this embodiment, main board 10 and small board 11 can be integrally formed at the same time by an ordinary wiring board manufacturing method. Therefore, it is possible to achieve a structure in which main board 10, which occupies most of control board 3, is kept away from coil 8 of stator 9, while magnetic sensor 12 is positioned close to magnet 5 of rotor 6 as described above, by simply adding relatively easy steps. These steps include a step for cutting board material 3*a*, a step for fixing small board 11 to main board 10 by screws 13, and a step for electrically connecting main board 10 and small board 11 by means of connecting member 14. Namely, electric actuator 1 which provides the above-described effects can be manufactured without significantly complicating the manufacturing process. In particular, by providing a protruding portion that is to become small board 11 in the empty space on one side of convex portion 10*a*, it is possible to efficiently form main board 10 and small board 11 while reducing waste of the board material 3*a*. Furthermore, in this embodiment, the distance between magnetic sensor 12 of small board 11 and magnet 5 of rotor 6 can be adjusted by adjusting the tightness of screw 13 that fixes small board 11 to main board 10, whereby the position of magnet 5 can be detected under optimal conditions and more precise detection can be achieved.

Figure 6:
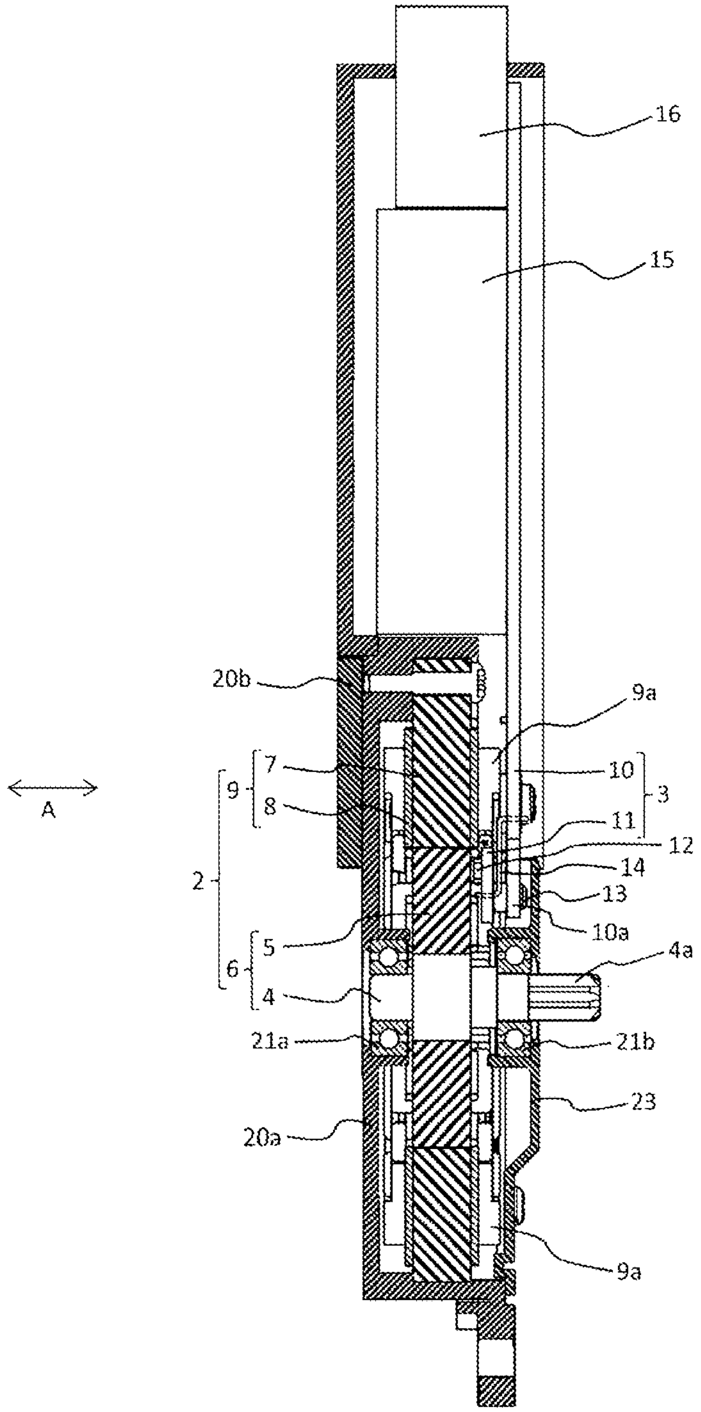
FIG. 6 is a sectional view showing the structure of the electric actuator including the basic structure shown in FIG. 1.
Figure 7:
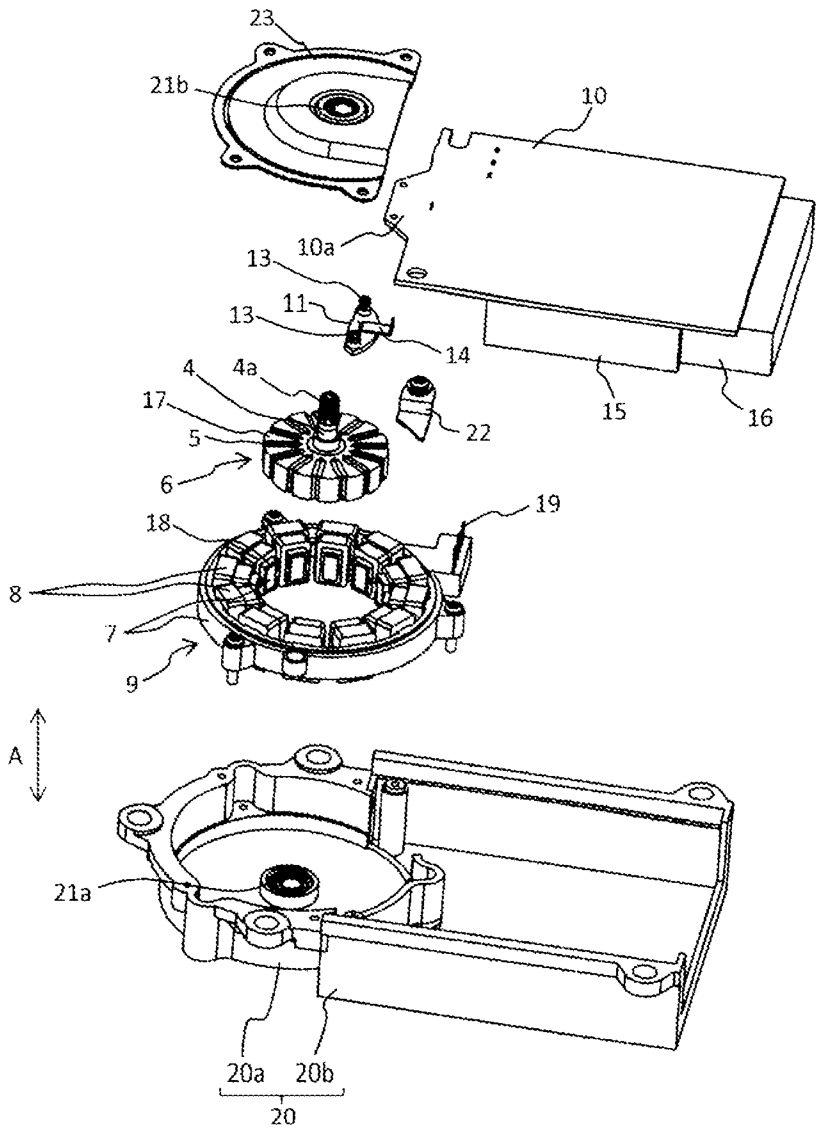
FIG. 7 is an exploded perspective view of main parts of the electric actuator shown in FIG. 6.

FIG. 6 is a sectional view showing a more detailed and specific view of the structure of electric actuator 1 including the basic structure shown in FIGS. 1 to 5, and FIG. 7 is an exploded perspective view of electric actuator 1 viewed from the main board 10 side. In electric actuator 1 shown in FIGS. 6 and 7, rotor 6 includes substantially disc-shaped laminated core 17 of the rotor, a plurality of magnets 5, and rotating shaft 4, and can be rotated as a unit. The plurality of magnets 5 are each installed in a respective one of a plurality of recesses provided in laminated core 17 of the rotor. Rotating shaft 4 is attached as the central axis of laminated core 17 of the rotor. Stator 9 includes substantially ring-shaped laminated core 7 of the stator, substantially ring-shaped insulator 18, and coil 8. Laminated core 7 of the stator has an inner diameter larger than the outer diameter of laminated core 17 of the rotor. Insulator 18 is fitted inside laminated core 7 of the stator. Coil 8 is wound around laminated core 7 of the stator. Three motor terminals (UVW terminals) 19 are attached to the stator laminated core 7 and are connected to coil 8.

In this electric actuator 1, bearing 21*a* is attached to case 20 formed by joining two case members 20*a* and 20*b*, and one end of rotating shaft 4 of rotor 6 is rotatably held by bearing 21*a*. Stator 9 is arranged to surround rotor 6 and is fixed to case 20. Main board 10 is arranged on the opposite side of case 20 in rotation axis direction A when viewed from rotor 6 and stator 9. Small board 11, which is fixed to main board 10, is located close to rotor 6. Terminal ground 22 is sandwiched between main board 10 and stator 9. Further, cover 23 is arranged at a position that faces case member 20*a* with rotor 6 and stator 9 disposed in between. Cover 23 is fixed to stator 9 and case 20 by screws. Bearing 21*b* is attached to cover 23, and a part of the other end portion of rotating shaft 4 of rotor 6 is rotatably held by bearing 21*b*. Gear 4*a* is attached to the end (other end) of rotating shaft 4 that passes through cover 23 and bearing 21*b* and that projects to the side opposite case 20.

Figure 8:
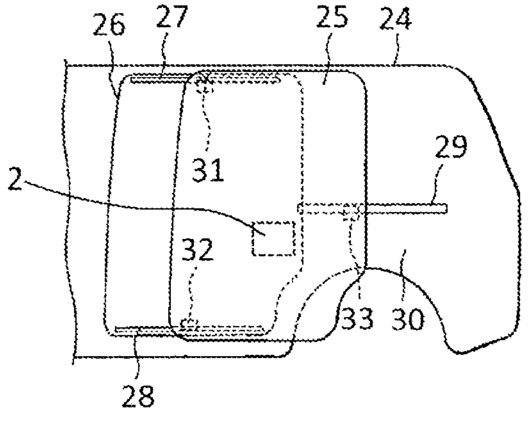
FIG. 8 is a side view schematically showing a part of a vehicle including a sliding door in which the electric actuator shown in FIG. 6 is used as a drive device.

Electric actuator 1 having the abovementioned structure is used as a drive device that drives various movement mechanisms by utilizing the rotation of rotor 6 that is generated when electric power is supplied to coil 8 of stator 9. For example, this electric actuator 1 is used as a drive device for an opening/closing mechanism of a sliding door of an automobile as shown in FIG. 8. Sliding door 25 is slidably attached to vehicle body 24 shown in FIG. 8, and passenger entrance 26 is closed by sliding door 25. Upper rail 27 is provided on the upper part of vehicle body 24, lower rail 28 is provided on the lower part of vehicle body 24, and center rail 29 is provided approximately in the vertical center of vehicle body 24. Center rail 29 is arranged on the outer side of quarter panel 30 of vehicle body 24. Upper rail 27, lower rail 28, and center rail 29 extend in the vehicle longitudinal direction. Sliding door 25 includes upper roller unit 31, lower roller unit 32, and center roller unit 33. Upper roller unit 31 engages with upper rail 27, lower roller unit 32 engages with lower rail 28, and center roller unit 33 engages with center rail 29, so that sliding door 25 is freely slidably attached to vehicle body 24.

Figure 9:
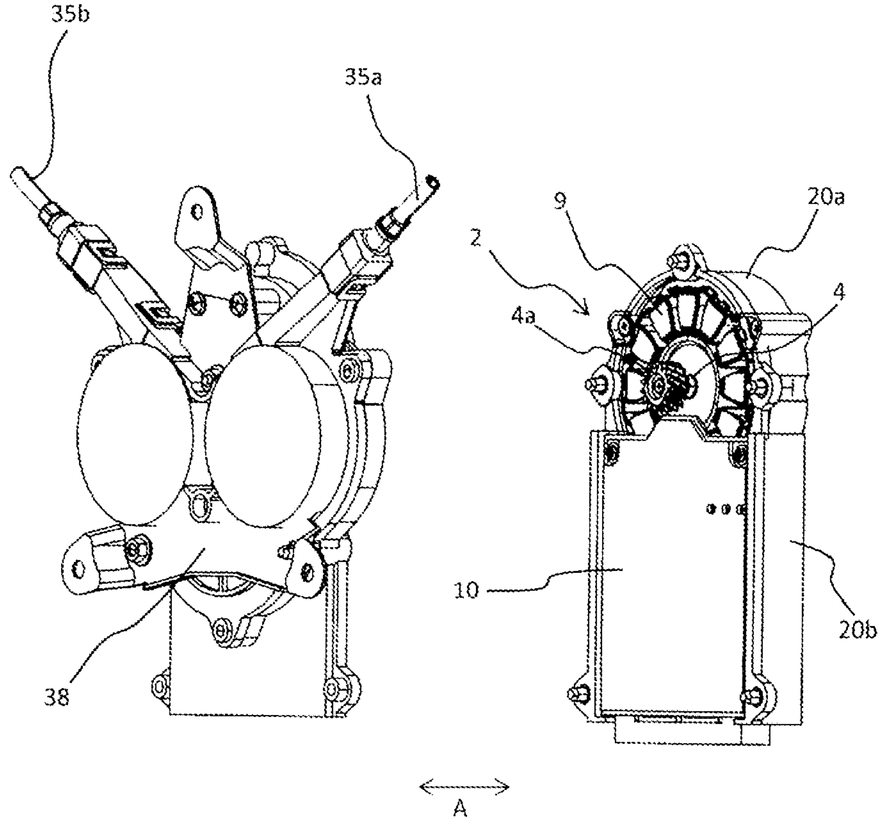
FIG. 9 is an exploded perspective view showing the opening/closing mechanism of the sliding door shown in FIG. 8.
Figure 10:
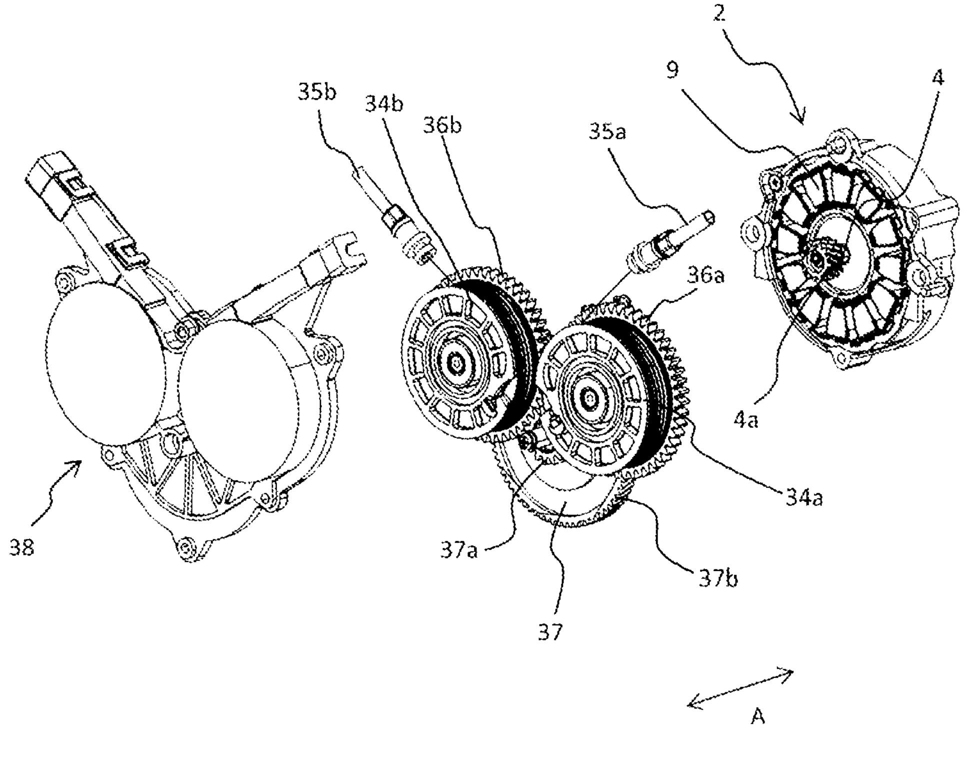
FIG. 10 is an exploded perspective view showing the main parts of the opening/closing mechanism shown in FIG. 9.
Figure 11:
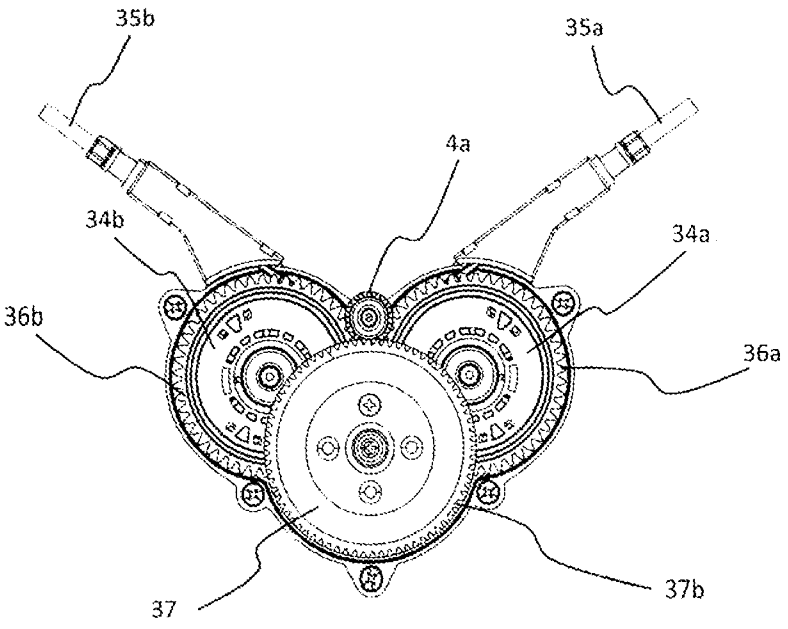
FIG. 11 is a front view showing the main parts of the opening/closing mechanism shown in FIG. 9.

FIGS. 9-11 show an opening/closing mechanism for opening and closing sliding door 25 shown in FIG. 8. In the structure shown in FIGS. 9-11, door-opening wire drum 34*a* and door-closing wire drum 34*b*, which are rotated by motor 2 of electric actuator 1, are provided. One end of door-opening cable 35*a* is connected to door-opening wire drum 34*a*, and one end of door-closing cable 35*b* is connected to door-closing wire drum 34*b*. The other end of door-opening cable 35*a* and the other end of door-closing cable 35*b* are connected to center roller unit 33 via a cable holder (not shown) or the like. When door-opening cable 35*a* or door-closing cable 35*b* is pulled, a roller (not shown) of center roller unit 33 rotates and sliding door 25 moves in the opening direction or the closing direction. Outer gear 36*a* is integrally formed with door-opening wire drum 34*a*, and outer gear 36*b* is integrally formed with door-closing wire drum 34*b*. Outer gear 36*a* and outer gear 36*b* each mesh with inner gear 37*a* of gear 37. Outer gear 37*b* of gear 37 meshes with gear 4*a* of rotating shaft 4 of motor 2. Door-opening wire drum 34*a*, door-closing wire drum 34*b*, and gear 37 are covered by cover 38.

Outer gear 37*b* of gear 37 meshes with gear 4*a* of rotating shaft 4 of motor 2 of electric actuator 1, and outer gears 36*a*, 36*b* mesh with inner gear 37*a* of gear 37, so that either door-opening cable 35*a* or door-closing cable 35*b* applies pull force to center roller unit 33 to move sliding door 25 in the opening direction or the closing direction.

By thus using electric actuator 1 of the present invention as a driving device for the opening/closing mechanism of sliding door 25 of an automobile, thin flat brushless motor 2 can be mounted, magnet 5 of rotor 6 can be detected by small board 11 that overlies main board 10, and ECU 15 can be placed in a position that does not overlie motor 2, whereby, the size of electric actuator 1 (in particular, the size in the rotation axis direction A) can be reduced, and electric actuator 1 can be easily arranged inside or near sliding door 25 in which many members are accommodated. Electric actuator 1 thus uses space efficiently and allows a high degree of freedom of arrangement. Furthermore, by using this type of brushless motor 2, rotational operation can be performed stably. Further, sliding door 25 can be easily stopped temporarily at an intermediate position between the fully open state and the fully closed state, and the stop position can be precisely controlled. However, electric actuator 1 of the present invention is not limited to use as a drive device for an opening/closing mechanism of sliding door 25 of a vehicle and can be widely used as a drive device for various moving mechanisms.

EXPLANATION OF REFERENCE NUMBERS

1 electric actuator
2 motor (brushless motor)
3 control board
3*a* board material
4 rotation axis
4*a* gear
5 magnet
6 rotor
7 core (laminated core of stator)
8 coil
9 stator
9*a* fixing mechanism
10 main board
10*a* convex part
11 small board
12 magnetic sensor (electrical part, Hall IC)
13 screw
14 connecting member
15 electronic control unit (ECU)
16 connector
17 laminated core of rotor
18 insulator
19 motor terminal (UVW terminal)
20 cases
20*a*, 20*b* case member
21*a*, 21*b* bearing
22 terminal ground
23 cover
24 vehicle body
25 sliding door
26 passenger entrance
27 upper rail
28 lower rail
29 center rail
30 quarter panel
31 upper roller unit
32 lower roller unit
33 center roller unit
34*a* door-opening wire drum
34*b* door-closing wire drum
35*a* door-opening cable
35*b* door-closing cable
36*a*, 36*b* outer gear
37 gear
37*a* inner gear
37*b* outer gear
38 cover
A rotation axis direction
L imaginary line

The invention claimed is:

1. An electric actuator, comprising:
an electric brushless motor having a rotor and a stator; and
a control board that has a plurality of electric components and that controls operation of said brushless motor, wherein:
said control board comprises a main board and a small board that has a smaller planar shape than said main board and that is connected to said main board via a connecting member,
said small board has one or more of said electric components, faces said rotor, and is arranged at a position closer to said rotor than said main board in a rotation axis direction of said rotor,
said small board is arranged parallel to said main board, and
said main board faces said stator.

2. The electric actuator according to claim 1, wherein said electric components included in said small board include a magnetic sensor that detects a magnet of said rotor.

3. The electric actuator according to claim 1, wherein said small board overlies a part of said main board when viewed in said rotation axis direction.

4. The electric actuator according to claim 3, wherein said main board has a convex portion that protrudes toward said rotor when viewed in said rotation axis direction, and said small board overlies said convex portion when viewed in said rotation axis direction.

5. The electric actuator according to claim 4, wherein said small board has the planar shape included within the planar shape of said convex portion.

6. The electric actuator according to claim 1, wherein said small board is fixed to said main board by a screw.

7. The electric actuator according to claim 1, wherein said main board has an electronic control unit at a position that does not overlap with said small board when viewed in said rotation axis direction.

8. A method for manufacturing an electric actuator, comprising:
installing an electric brushless motor having a rotor and a stator;
cutting a board material which has a plurality of electrical components to separate said board material into a main board and a small board that has a smaller planar shape than said main board and that has one or more of said electrical components;

arranging said small board at a position that faces said rotor and that is closer to said rotor than said main board in said rotation axis direction of said rotor; and connecting said small board to said main board by a connecting member, wherein said small board is arranged to partially overlie said main board when viewed in said rotation axis direction.

9. The method of manufacturing an electric actuator according to claim 8, wherein said electric components included on said small board include a magnetic sensor that detects a magnet of said rotor, and said small board is arranged such that said magnetic sensor faces said magnet.

10. The method for manufacturing an electric actuator according to claim 8, wherein said main board has a convex portion that protrudes toward said rotor when viewed in said rotation axis direction, and a protruding portion that is to become said small board is formed as one unit with said board material at a position adjacent to a portion that is to become said convex portion of said main board, and said protruding portion is cut from said board material to separate said small board and said main board.

11. The method of manufacturing an electric actuator according to claim 10, wherein said small board has the planar shape included within the planar shape of said convex portion, and said small board is arranged to overlie said convex part when viewed in said rotation axis direction.

12. The method for manufacturing an electric actuator according to claim 8, wherein said small board is fixed to said main board by a screw, and the distance between said small board and said rotor is adjusted by said screw.

13. The method for manufacturing an electric actuator according to claim 8, wherein said main board has an electronic control unit, and said small board is arranged so as not to overlie said electronic control unit when viewed in said rotation axis direction.

* * * * *